June 18, 1963

M. B. CONRAD 3,094,169

RETRIEVABLE PACKER

Filed Aug. 8, 1958

INVENTOR,
MARTIN B. CONRAD
BY Lyon & Lyon
ATTORNEYS

June 18, 1963  M. B. CONRAD  3,094,169
RETRIEVABLE PACKER
Filed Aug. 8, 1958  9 Sheets-Sheet 2

INVENTOR,
MARTIN B. CONRAD
BY Lyon & Lyon
ATTORNEYS

June 18, 1963  M. B. CONRAD  3,094,169
RETRIEVABLE PACKER
Filed Aug. 8, 1958  9 Sheets-Sheet 3

INVENTOR.
MARTIN B. CONRAD
BY Lyon & Lyon
ATTORNEYS

June 18, 1963

M. B. CONRAD

3,094,169

RETRIEVABLE PACKER

Filed Aug. 8, 1958

INVENTOR,
MARTIN B. CONRAD
BY
Lyon & Lyon
ATTORNEYS

United States Patent Office 3,094,169
Patented June 18, 1963

3,094,169
RETRIEVABLE PACKER
Martin B. Conrad, P.O. Box 1026, Downey, Calif.
Filed Aug. 8, 1958, Ser. No. 754,002
31 Claims. (Cl. 166—134)

The present invention relates to well tools, and more particularly to improvements in well packers adapted to be run into a well on a tubing or pipe string and to pack-off the annulus between the running-in string and the casing during such fluid injection well treatments or operations as squeeze cementing, formation fracturing, acidizing, casing testing, or the like.

Among the primary objectives of the invention is the provision of an outstandingly versatile tool which is susceptible of a wide range of variation in the manner of its usage.

Well tools of the type here involved generally include a mandrel or tubular body adapted to be connected to a running-in string of tubing or pipe, anchor slips expansible into engagement with the well casing to anchor the tool, casing engaging friction means in the form of drag blocks or springs for effecting expansion of the slips responsive to axial movement of the mandrel; latch means for releasably securing the casing engaging friction means to the mandrel during running of the tool into the well, this latch means being releasable responsive to rotation of the running-in string and mandrel, and packer means expansible into engagement with the casing upon axial movement of the mandrel.

In tools of the aforementioned type wherein the casing engaging anchor slips and the packing elements are spaced axially of the tool, and particularly where the packing element is disposed above the slips, and the slips and packing element are expanded into engagement with the casing upon setting down or lowering of the running-in string, the packer rubber tends to be forced into eccentric relation to the casing resulting in inferior sealing with the casing well. Moreover, pressure in the well acting beneath the packer assembly tending to elevate the same in the casing, has a tendency to blow past the packing element if the latter is not centralized within the casing and uniformly in engagement with the casing. Accordingly, another object of the invention is to provide a packer assembly including hold-down slips mounted in axially spaced relation to the anchor slips, with the packing element disposed between the hold-down and anchor slips so that the tool is centralized in the casing by the spaced slips, and the packer rubber is accordingly maintained concentric in the casing and is capable of withstanding extremely high pressures therebelow.

In furtherance of the preceding objective, an additional object is to provide improved means for locking the hold-down slips, this locking means being responsive to hydraulic pressure resulting from the pumping of fluid down the running-in string and through the tubular mandrel. In this connection the mandrel is surrounded by a tubular member which defines, with the mandrel, a pressure chamber, in which is shiftably disposed an annular piston. The hold-down slips are set as a result of relative axial movement between the mandrel and the tubular member, and the locking means includes a contractible member disposed about the mandrel but adapted to be wedged or cammed, in one embodiment, into engagement with the mandrel so as to prevent movement of the mandrel in a direction to release the hold-down slips; in other embodiments of the invention the locking means is so constructed as to be flexed as a result of fluid pressure in the pressure chamber so as to frictionally grip the mandrel, or so as to effect engagement of co-operative teeth or wickers on the element and the mandrel as a function of a resultant vector force. One important novel feature of the hold-down slip locking means is the provision of means whereby the lock may be positively released in the event that the annular piston in the pressure chamber should fail to permit disengagement of the locking element when pressure in the chamber is relieved.

Another object of the invention is to provide novel control mechanism, including means for releasably latching the casing engaging friction means to the mandrel to prevent the anchor slips from being engaged until such time as the latch means have been disengaged. In previous packers and other well tools, including releasable latch means of the general type here involved, the latch means have been releasable responsive to rotation of the mandrel and in a predetermined direction to a predetermined extent relative to the casing engaging friction means. In accordance with the present invention, however, means are provided whereby the latch means may be released responsive to rotation of the mandrel to a selected extent ranging, for example, from ¾ of a revolution to 2¾ revolutions, more or less. In addition, the direction of rotation of the mandrel may, by reason of the novel control mechanism hereof, be either in a right-hand or left-hand direction, as may be desired.

In the use of well tools or packers of the present type, the wants of operators vary widely, and accordingly the provision of a versatile tool which may be selectively dressed for right or left-hand operation and for a selected extent of rotational movement, is an extremely desirable feature of the invention. Moreover, in retrieving a packer from a well following its employment in a well-treating operation or the like, the running-in string must be broken down into lengths by unthreading the couplings thereof. Some operators break these threaded joints by the use of tongs on a stand or length of pipe or tubing suspended in the derrick, while the pipe which remains in the well is held stationary in the rotary table which is locked against rotation. Other operators prefer to break these joints in the running-in string by employing a stationary tong on a stand of pipe disposed above the rotary table while rotating the rotary table to disengage the threaded joint—this latter operation being commonly referred to as "rotating out of the hole." In ordinary packer constructions rotating out of the hole is not practical or desirable, inasmuch as the drag blocks or other casing engaging friction means are also caused to rotate within the casing, with consequent potential damage and wear.

A further object of the present invention, therefore, is to provide a novel control mechanism including means for allowing the casing engaging friction means or drag blocks to freely swivel about the mandrel, as the running-in string is being rotated by a rotary table to uncouple the running-in string.

Yet another object is to provide a novel control mechanism for well tools or packers of the type herein disclosed, which provides a positive drive for effecting release of the latch means upon rotation of the mandrel in one direction, while enabling free swivelling of the mechanism upon rotation of the mandrel in the opposite direction.

As will become apparent as the description progresses, various features of the invention may be embodied in well tools of the type which are set responsive to setting-down or lowering the running-in string, or responsive to tensioning or elevating the running-in string. In either case, the control mechanism is readily accessible for assembly on the mandrel and disassembly therefrom so as to facilitate selectively dressing the tool for righthand or lefthand rotation to effect disengagement of the releasable latch mechanism, and so as to facilitate dressing of the tool selectively for rotation to a selected extent.

Other objects and advantages of the invention will be hereinafter described or will become apparent to those skilled in the art, and the novel features thereof will be defined in the appended claims.

In the accompanying drawings:

FIGS. 1a and 1b are views in longitudinal section through a set-down type packer, made in accordance with the invention; FIG. 1b being a downward extension of FIG. 1a, certain of the parts being shown in elevation and a portion of the mandrel being broken away in FIG. 1b to more clearly show the control mechanism, the packer being in condition for running the same into a well or retrieval from the well;

FIG. 3b is an exploded detail view in perspective, with certain of the parts broken away and shown in section, more particularly showing the mechanism of FIG. 3a;

FIG. 5a is a transverse sectional view, on an enlarged scale, as taken on the line 5a—5a of FIG. 1b, and particularly showing the selector mechanism for determining the extent of mandrel rotation required to disengage the latch mechanism, the selector mechanism being dressed such that approximately ¾ of a revolution of the mandrel will be effective to disengage the latch mechanism;

FIG. 5b is a view corresponding to FIG. 5a, but showing the selector mechanism adjusted for approximately 1¾ mandrel revolutions;

FIG. 5c is a view similar to FIGS. 5a and 5b, but showing the selector mechanism set for approximately 2¾ mandrel revolutions;

FIG. 6b is a view in transverse section on a slightly reduced scale, as taken on the line 6b—6b of FIG. 6a;

FIG. 6c is a view similar to FIG. 6b, but showing the lock mechanism engaged with the mandrel, as taken on the line 6c—6c of FIG. 2a, on an enlarged scale;

FIG. 8a is a transverse sectional view, on an enlarged scale, as taken on the line 8a—8a of FIG. 7a;

FIG. 8b is a view similar to FIG. 8a, but showing the parts rotated as for permitting the packer to be set in the well casing;

FIG. 9a is a transverse sectional view on an enlarged scale as taken on the line 9a—9a of FIG. 7a;

FIG. 9b is a view similar to FIG. 9a, but with the parts rotated, as for permitting the packer to be set in the well casing;

FIG. 10 is a transverse sectional view on an enlarged scale as taken on the line 10—10 of FIG. 7a;

FIG. 11a is a fragmentary view in longitudinal section through a modified form of hold-down slip lock mechanism, the lock mechanism being disengaged from the mandrel.

FIG. 11b is a view similar to FIG. 11a, but showing the lock mechanism engaged with the mandrel;

FIG. 12 is a fragmentary view in transverse section as taken on the line 12—12 of FIG. 11a;

Like reference characters in the several views of the drawings and in the following description designate corresponding parts.

Figure 1A:
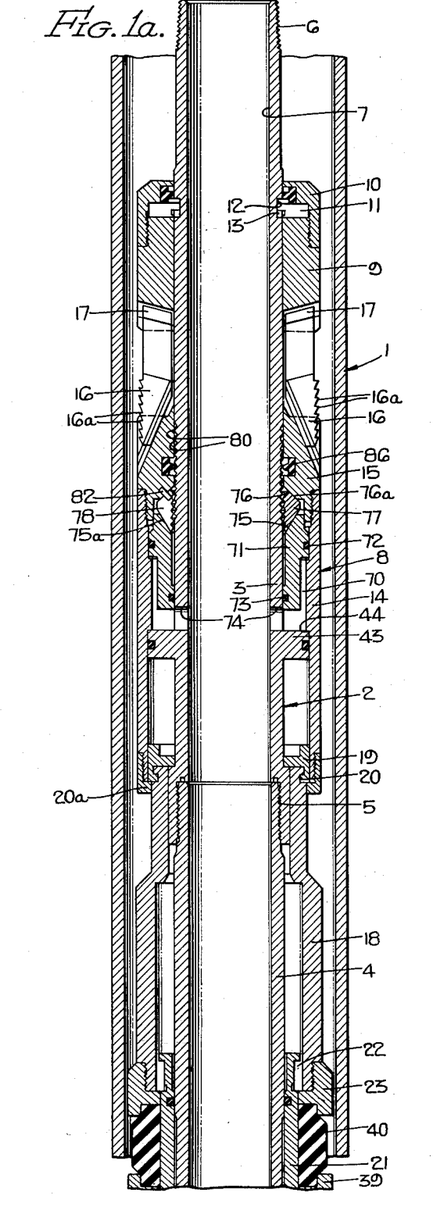
Figure 1B:
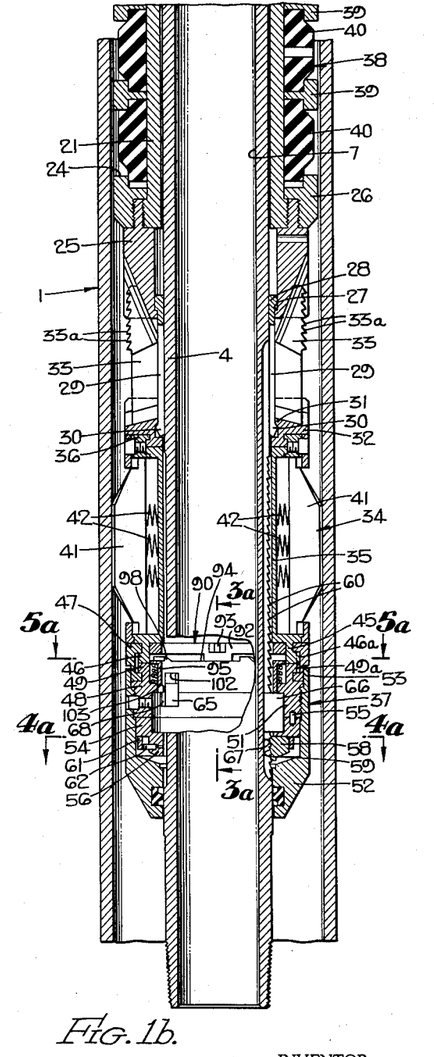

Referring particularly to FIGS. 1a and 1b, well casing is generally designated at 1, and disposed in the casing is a packer assembly made in accordance with the invention. The packer, as illustrated, includes a longitudinally extended tubular member or mandrel generally designated 2, which is comprised of an upper mandrel section 3, and a lower mandrel section 4, threadedly interconnected as at 5.

At its upper extremity, the mandrel 2 is provided with a thread 6, whereby the mandrel is adapted to be coupled to a running-in string of tubing or pipe upon which the packer may be lowered into the well casing 1, to be set during the performance of certain well treating operations such as squeeze cementing, formation fracturing, acidizing, casing testing, or the like. Extending through the mandrel 2 is a bore 7, which is the same size as the inside diameter of the running-in pipe or tubing, so that the present packer may be characterized as a "full-flow" tool which offers no restriction to the flow of fluid therethrough. In addition, by reason of the bore 7 being at least equal to the running-in tubing or pipe opening, certain through tubing wire line operations may be performed through the packer assembly. For example, perforating guns, formation testers and the like may readily pass downwardly through the packer bore 7.

Tubular means 8 is concentrically disposed about the mandrel 2 and includes a series of relatively axially movable telescopically interfitting tubular members. Uppermost of these tubular members is a slip ring 9, having a retainer cap 10 threadedly connected thereto, with a split retainer ring 11 confined between the cap 10 and the sleeve 9 and projecting radially inwardly into an annular groove 12 extending about the mandrel 2. The groove 12 has a greater axial extent than the split ring 11 so as to permit a limited amount of relative axial movement between the slip sleeve 9 and the mandrel 2 for assembly purposes as will hereinafter be more readily apparent.

A resilient ring 13 engages with the shoulder provided at the base of the groove 12 and with the inner surface of the split retainer ring 11, and normally biases the slip ring 9 upwardly with respect to the mandrel 2. Disposed below the slip ring 9 is a tubular housing 14 which is disposed about the mandrel 2 in spaced relation thereto. At its upper extremity the housing 14 is provided with, or has connected thereto, an expander cone 15 tapered towards the slip sleeve 9 and having slidably connected thereto, as by a dove-tailed fit, a series of circumferentially spaced tapered slips 16, the slips 16 also being provided with a dove-tailed connection, as at 17, to the lower extremity of the slip sleeve 9. Thus, expander cone 15 and slip ring 9 are interconnected by slips 16, and upon relative axial movement of the slip sleeve 9 and the expander 15, the slips 16 will be wedged outwardly into engagement with the casing 1, or retracted from engagement with the casing.

Disposed below the tubular housing 14 is a tubular connector sub 18, which is also disposed about the mandrel 2 for axial movement thereon and for rotative movement thereabout. The lower extremity of tubular housing 14 and the upper extremity of connector sub 18 are disposed in overlapped relation and are swivelly interconnected, as by means of a split swivel ring 19, engaged in a groove 20 in the connector sub 18, and engaged by a housing cap 20a which provides an inwardly projecting shoulder for limiting relative axial movement of the tubular housing 14 and the connector sub 18 in one direction.

The tubular means 8 further includes a packing element supporting sleeve 21, which is disposed about the mandrel 2 and projects upwardly into connector sub 18 at the lower extremity of the latter, the sleeve 21 being engaged at its upper extremity with a split ring 22 which shoulders with an annular abutment member 23, the latter being formed on, or connected to, the lower extremity of the connector sub 18, whereby relative axial movement of the connector sub 18 and the packing element supporting sleeve 21 is limited in one direction. At its lower extremity, the sleeve 21 is provided with a radially outwardly projecting flange 24, provided by the connection to the sleeve 21 of a downwardly tapered expander cone 25 and an abutment ring 26 which are threadedly interconnected.

It will be noted that the expander 25 extends about the lower mandrel section 4 in spaced relation thereto, and is provided with a radially inwardly projecting shoulder 27 with which is engaged the upper end of a tie sleeve 28, having a plurality of circumferentially spaced fingers 29 provided at their lower extremities with protuberances 30 for engagement beneath an inwardly projecting shoulder 31 of an anchor slip ring 32. Accordingly, the tie 28 interconnects the expander 25 and the anchor slip ring 32 against separation in an axial direction, but the expander 25 is free to move axially towards the slip ring 32, as will hereinafter more fully appear.

Shiftably interconnected with the expander 25 and with the slip ring 32, so as to be wedged outwardly into engagement with the casing 1 and so as to be retracted from engagement with the casing, is a series of circumferentially spaced anchor slips 33 provided with dove-tailed connections to the expander 25 and the slip ring 32, respectively, at opposite ends of the slips 33. Depending from the slip ring 32, is casing engaging friction means, generally designated 34, and including a drag block carrier 35, which is connected to the slip ring 32 as by means of a swivel ring 36. Disposed beneath the drag block carrier 35 and interconnected therewith in a manner which will hereinafter be described, is control mechanism, generally designated 37.

Thus it will be seen that the tubular means 8 disposed about the mandrel 1 is constituted by a series of interconnected relatively axially movable elements comprising upper hold-down slip ring 9, expander 15, tubular housing 14, connector sub 18, packing element supporting sleeve 21, expander 25, tie 28, anchor slip ring 32 and drag block carrier 35.

In the illustrative embodiment a series of three vertically spaced packer rubbers are shown as making up a packing element 38, the packing element including gauge rings 39, 39 interposed between the independent rubber rings designated 40.

The abutment member 23 is slidably disposed upon the packing element supporting sleeve 21 for movement towards the flange 24, and as a result of such movement the packer rubbers 40 which are disposed between the abutment member 33 and the flange 24, will be axially loaded and caused to expand radially into engagement with the casing 1 in a conventional manner. Axial movement of the mandrel 2 within the tubular means 8 will also effect expansion of the anchor slips 33 into engagement with the casing prior to full expansion of the packer rubbers 40, in a manner which will hereinafter appear.

In order to effect the setting of the packer rubbers 40 and anchoring of the slips 33, the casing engaging friction means 34 includes a suitable number of friction drag blocks 41, shiftably disposed in windows in the drag block carrier 35 and resiliently biased into engagement with the casing 1 as by a number of springs 42. The drag blocks 41 are urged into engagement with the casing with such a force that sufficient friction exists between the drag blocks and the casing that as the mandrel 2 moves downwardly within the tubular means 8, the drag block carrier 35 will remain stationary in the casing while the elements of the tubular means 8, as previously described, telescope upon one another.

The mandrel 2 is provided with an outstanding annular flange 43 which is slidable within the tubular housing 14 between the swivel ring 19 and an internal shoulder 44 on the tubular housing 14. Movement of the mandrel 2 axially in one direction will effect engagement of the flange 43 with shoulder 44 so as to maintain the tubular means 8 stretched out to the limit as shown in FIGS. 1a and 1b.

Means are provided for releasably latching the tubular mandrel 2 and the tubular means 8 in the particular stretched out relationship shown in FIGS. 1a and 1b, so that the tool may be run into a well casing or retrieved therefrom. In this connection, the tubular means 8 is provided with a downward extension comprising the control mechanism 37 previously referred to.

Figure 3A:
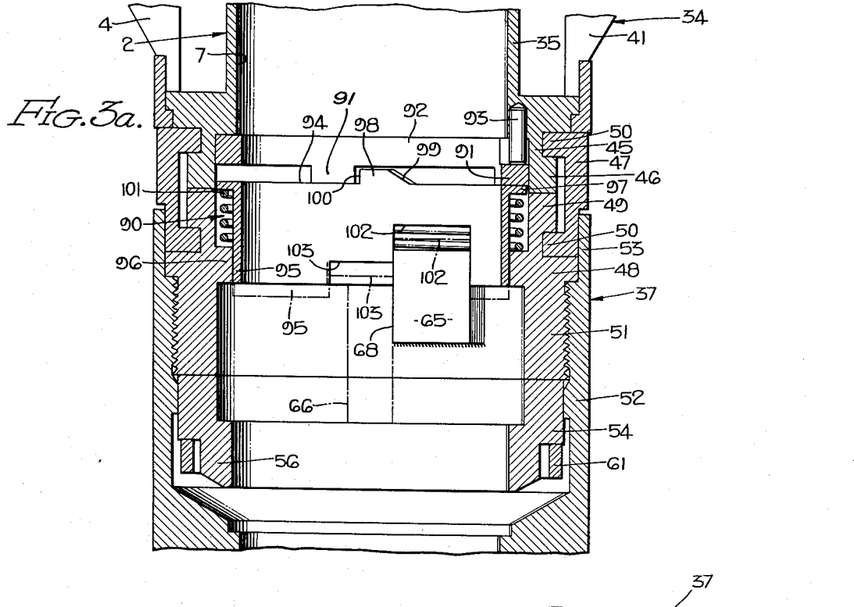
FIG. 3a is an enlarged fragmentary detail view in longitudinal section particularly showing the control mechanism elements which enable retrieval of the packer by rotating out of the hole, this view being taken substantially on the line 3a—3a of FIG. 1b.

Depending from the lower extremity of the drag block carrier 35, is a cylindrical extension 45 having a radial flange 46 to which is secured, as by means of a split swivel ring 47, an annular swivel adaptor 48 having at its upper end a radial flange 49 rotatably engaged with the flange 46 of the drag block carrier 35. This structure is best seen in FIG. 3a, wherein it will be noted that the swivel ring 47 is provided with a pair of axially spaced internal radial flanges 50, 50, respectively, engaged above and below flanges 46 and 49 just referred to and securing the latter against axial separation while permitting free relative rotation.

Swivel adaptor 48 has a cylindrical skirt 51, to which is threadedly secured a control mechanism housing 52, the latter having an axially extended skirt 53 surrounding the split swivel adaptor ring 47 so as to secure the latter against displacement. Disposed beneath the swivel adaptor 48 is a dog carrier ring 54 which is pinned to the swivel adaptor 48, as by a dowel 55.

Formed on the dog carrier 54 is a depending skirt 56 which is slotted or notched, as at 57 (see FIGS. 4a and 4b) to accommodate a dog 58 which is in the form of an arcuate segment having internal wickers 59 thereon for engagement with wickers or threads 60 extending about the mandrel 2. An annular spring 61 embraces the skirt 56 on dog carrier 54, and resiliently retains the dog 58 in engagement with the mandrel 2. The spring 61 is preferably of a greater diameter than skirt 56 and is maintained in engagement with the dog 58 by means of a contact pin 62 projecting radially from the skirt 56 of dog carrier 54. The threads or wickers 60 are discontinuous, being interrupted by a longitudinally extended groove or clearance space 63, as best seen in FIG. 4a, adapted to receive the dog 58 upon rotation of the mandrel 2 in a manner which will hereinafter be described.

Internally of the swivel adaptor 48 there is provided a radially inwardly directed stop lug or projection 65 which is disposed in the path of a drive key 66, the key 66 being disposed in an axially extended key slot 67 in the outer surface of the mandrel 2, the key 66 also being disposed within the annular space between the mandrel 2 and the swivel adaptor 48 and dog carrier 54.

Figures 4A, 4B:
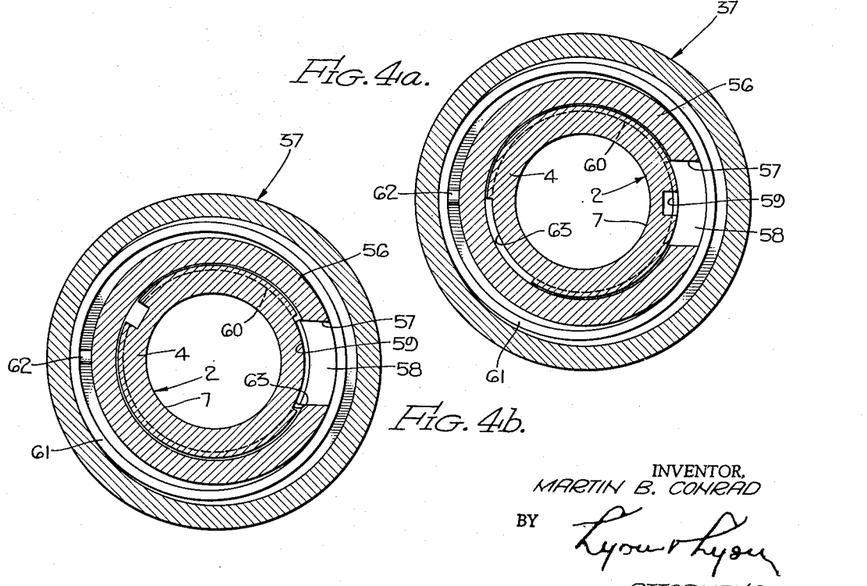
FIG. 4a is a transverse sectional view, on an enlarged scale, as taken on the line 4a—4a of FIG. 1b.
FIG. 4b is a view corresponding to FIG. 4a, but taken on the line 4b—4b of FIG. 2b.

As viewed in FIG. 1b, rotation of the mandrel 2 in a clockwise direction will bring key 66 into engagement with side face 68 of the stop projection 65, at which time the dog 58 will be disposed in the clearance space or slot 63 through the mandrel wickers 60, as shown in FIG. 4b, and the mandrel will accordingly be free to move downwardly through the tubular means 8 and the control mechanism 37. Thus the dog 58 and its related operating mechanism constitute means for releasably latching the mandrel 2 to the tubular assembly 8, so as to prevent relative axial movement therebetween as the tool is being run into a well.

Figures 5A, 5B, 5C, 10:
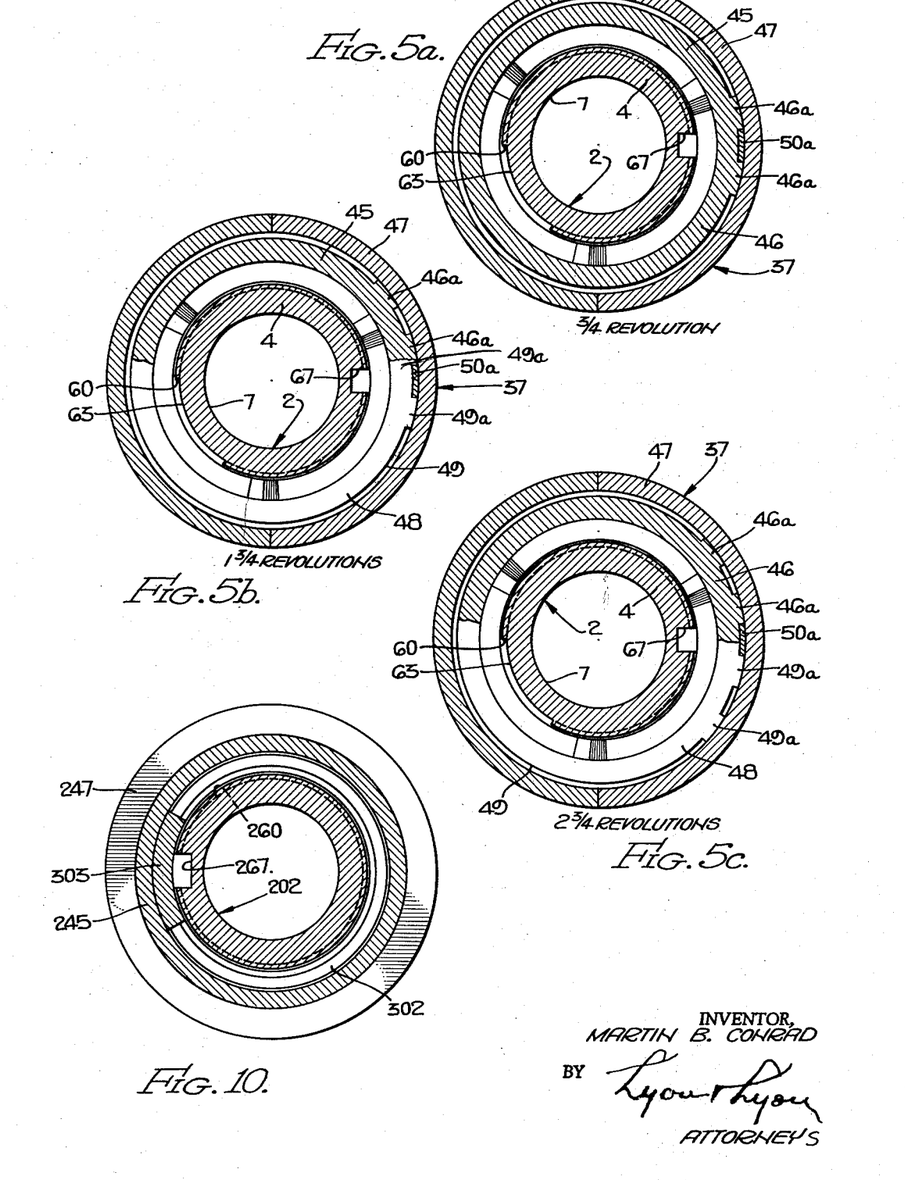

In accordance with one of the features of the invention, means are provided for selectively dressing the tool so that the mandrel 2 must be rotated relative to the casing engaging friction means 34, to an extent ranging from approximately ¾ of a revolution, to approximately 2¾ revolutions of the mandrel. In order to accomplish this in the illustrative embodiment, the flanges 46 and 49 on the drag block carrier 35 and the swivel adaptor 48 are respectively provided with pairs of radially outwardly projecting circumferentially spaced lugs 46a and 49a, with particular reference to FIGS. 1b, 2b, and 5a through 5c. The swivel adaptor ring 47, between its flanges 50, is provided with an axially extended key 50a, which may be disposed between the lugs 46a and 49a of drag block carrier 35 and swivel adaptor 48, respectively, in a selective manner as particularly illustrated in FIGS. 5a, 5b and 5c. In FIG. 5a, the key 50a is disposed between lugs 46a and is also disposed between lugs 49a which underlie lugs 46a and are accordingly concealed. As shown in FIG. 5a, the drag block carrier 35 and the swivel adaptor 48 are keyed together so as to be relatively non-rotatable. The swivel adaptor 48, therefore, is rigidly connected to the casing engaging friction means 34. The mandrel 2 is thus free to rotate in a clockwise direction from the position shown in FIG. 4a to the position shown in FIG. 4b, at which time the key 66 will engage the face 68 of stop lug 65 and the latching dog 58 will be disposed in the vertical slot or clearance 63 in the mandrel, thus to enable axial movement of the mandrel through the tubular means 8.

Referring to FIG. 5b, the key 50a is disposed between lugs 49a on flange 49 of the swivel adaptor 48, but both lugs 46a on flange 46 of drag block carrier 35 are disposed to one side of the key 50a. Accordingly, swivel adaptor 48 is free to rotate through substantially one revolution, or until key 50a is carried into engagement with one of the lugs 46a of drag block carrier 35. This revolution of the mandrel, it will be understood, is added to the approximately ¾ of a revolution required to bring key 66 into abutting engagement with face 68 of stop block 65. Therefore, following approximately one revolution of the mandrel 2, the swivel adaptor 48 will be rigidly connected to the drag block carrier 35 through key 50a and lugs 46a and 49a, following which the mandrel will continue to rotate through approximately ¾ of a revolution until the key 66 engages face 68 of stop block 65.

Referring to FIG. 5c, a third position is shown wherein the key 50a is not engaged between either lugs 46a or lugs 49a, so that upon rotation of the mandrel 2 in a clockwise direction the swivel adaptor 48 and dog carrier 54 will rotate with the mandrel until one of the lugs 49a engages the key 50a, whereupon the swivel adaptor ring 47 will then travel with the swivel adaptor 48 until the key 50a engages with one of the lugs 46a; whereupon the swivel adaptor 48 will be rigidly connected to the drag block carrier 45. Following rotative movement of the mandrel in this manner through substantially two full revolutions, then the key 66 will, upon approximately ¾ of a further revolution of the mandrel, engage face 68 of stop block 65, and the slot 63 in mandrel 2 will be so disposed as to receive the dog 58 thus rendering the mandrel free for axial movement relative to the tubular means 8.

Figures 2A, 2B:
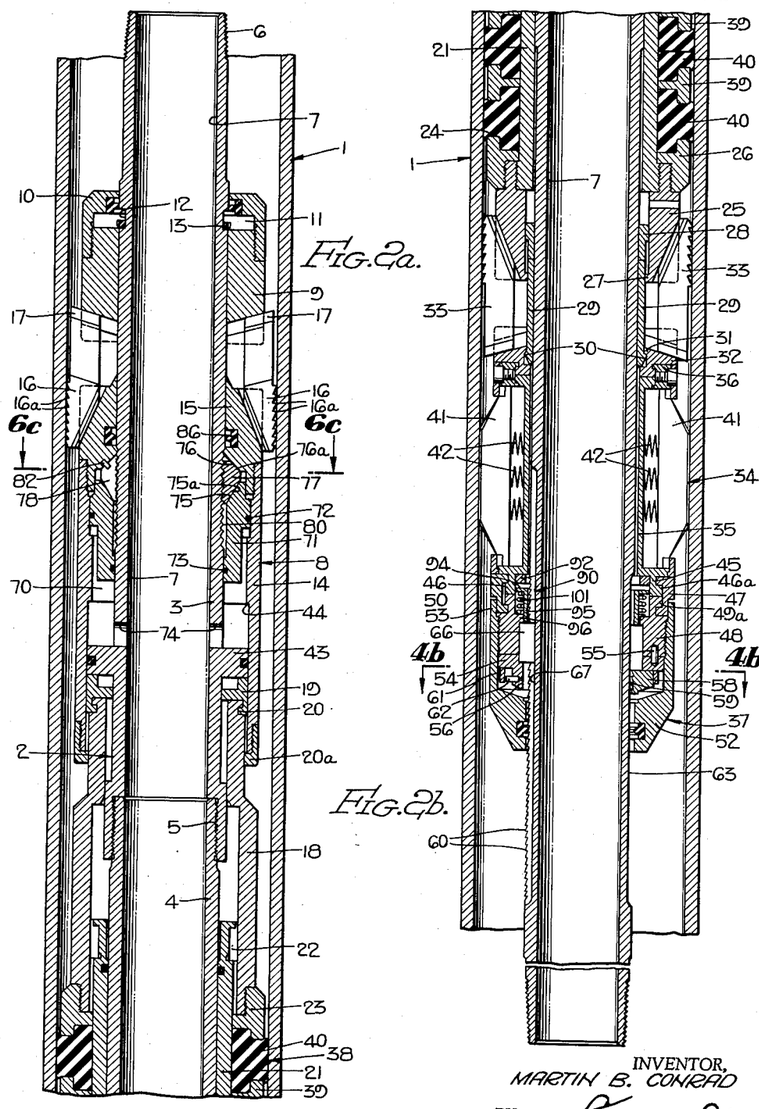
FIGS. 2a and 2b are views generally corresponding to FIGS. 1a and 1b, but showing the anchor and hold-down slips, as well as the packing element, set in engagement with the well casing.

When the mandrel has been freed for axial movement, then the running-in string may be set down, causing the mandrel to move downwardly with respect to the tubular means 8 to set the tool as shown in FIGS. 2a and 2b. Initial downward movement of the mandrel 2 will effect corresponding downward movement of the slip sleeve 9 and slips 16, which may be cammed outwardly into engagement with the casing 1 by the expander 15. However, the slips 16 are provided with upwardly facing wickers or teeth 16a, which will slide along the casing wall so that the slips 16 will impart downward movement to the expander 15 and consequently to tubular housing 14 which telescopes over the connector sub 18. Alternatively, friction between expander 15 and the mandrel may cause co-travel thereof, under which circumstances, the slips 16 will not be initially expanded but will remain in the same relative position as shown in FIG. 1a, as the slip ring 9, slips 16, tubular housing 14 and expander 15 move downwardly with the mandrel and the tubular housing 14 telescopes over connector sub 18. In either event, however, the slip sleeve 9, the expander 15 and tubular housing 14, will move with the mandrel 2 so far as necessary to enable engagement of the mandrel flange 43 with the swivel ring 19. Engagement of the flange 43 with swivel ring 19 will impart downward movement to the connector sub 18, which will be transmitted through packing element 38 to the lower expander 25 which will be forced downwardly relative to the anchor slips 33, thereby wedging the latter into engagement with the casing 1, since downward movement of the anchor slips 33 is resisted by the casing engaging friction means 34. Therefore, as a function of downward movement of the mandrel 2, the downwardly facing wickers 33a of slips 33 will bite into the casing 1, thereby firmly anchoring the packing element supporting sleeve 21 against movement downwardly in the casing; whereupon continued downward movement of the mandrel 2 will cause axial loading and consequent radial expansion of the packer rubbers 40 into engagement with the casing 1, as the abutment member 23 telescopes along the packing element sleeve 21 to the position shown in FIG. 2a. Thus the anchor slips 33 and the packing element 38 will be firmly set in engagement with the casing.

When a packer having a packer rubber disposed above the anchor slips is secured in well casing by the setting down of the running-in string, the weight of the running-in string of pipe would ordinarily tend to cause the pipe string to bow into engagement with the casing wall thus creating eccentric relationship of the packing rubbers within the casing. Moreover, high pressure in the well beneath the packer tend to elevate the packer assembly, and in the absence of a true concentric relationship of the packer rubbers in the casings, such high pressures tend to blow past the packer element. Therefore, in accordance with another of the salient features of the invention, novel hold-down slip locking means are provided whereby, as a function of the pressure of fluid being pumped through the mandrel 2, the hold-down slips 15 will be firmly locked in engagement with the casing 1 and, in addition, will centralize the mandrel or body 2 so that it is concentrically disposed within the casing 1, thus substantially increasing the effectiveness of the packer element as well as substantially extending its life.

In the illustrative embodiment, the tubular housing 14 is disposed in radially spaced relation to the upper mandrel section 3, so as to provide therebetween a pressure chamber 70, defined between the radial flange 43 on the mandrel and an axially movable annular piston 71 which is disposed in the space between the tubular housing 14 and the mandrel section 3, and respectively sealed thereto as by means of an O-ring or the like as at 72 and 73.

The mandrel section 3 is ported as at 74 so as to admit fluid under pressure into the pressure chamber 70. At its upper end, the piston 71 is provided with internal tapered wedging surface 75 which is preferably at an angle on the order of about 30°. Opposed to the wedging surface 75, the expander 15 is provided with a wedging surface 76 which is preferably at an angle on the order of about 45°. Disposed between the opposing wedging surfaces 75 and 76 is a resilient lock ring 77 which is split or slotted at one side, as at 78, and which has a normally relaxed diameter such that it freely permits passage of the mandrel 2 therethrough. The lock ring 77 is provided with an angularly disposed face 76a complemental to the wedging surface 76 of cone 15, as well as with an angularly disposed lower face 75a complemental to the wedging surface 75 of piston 71.

Figure 6A:
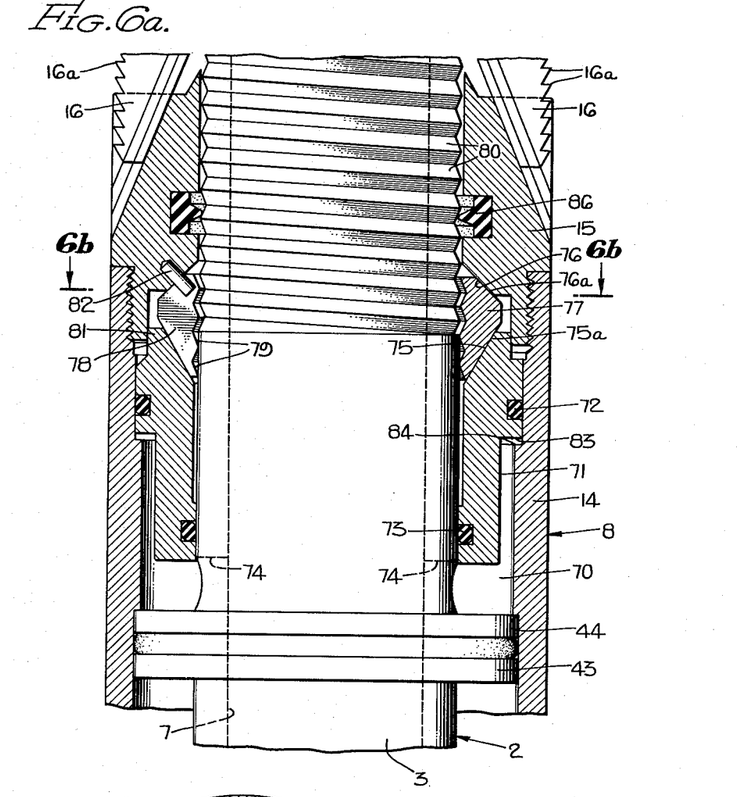
FIG. 6a is an enlarged fragmentary view in longitudinal section with the mandrel in elevation, showing one form of the novel hold-down slip lock mechanism of the invention, the lock mechanism being disengaged as when the packer is being run into a well or retrieved therefrom.

Internally of the lock ring 77 it is preferably provided with wickers 79 which, as best seen in FIG. 6a, in this embodiment of the invention, are preferably in the form of a uniform thread having a pitch on the order of 20°. The mandrel section 3 is provided with a complemental uniform thread 80, adapted to be engaged by the internally threaded lock ring 77 in a manner to securely lock the mandrel against upward movement.

Upon pressurizing the chamber 70 responsive to the pumping of well treating fluid downwardly through the mandrel 2, the piston 71 will be shifted towards the expander 15, lock ring 77 will resist constriction between wedge faces 75, 76 and consequently the tubular housing 14 and the expander 15 will be forced upwardly by pressure beneath piston 71, thus expanding slips 16 tightly into engagement with the casing. As pointed out above, it is possible that the slips 16 will upon pressurizing chamber 70 already be in engagement with the casing, in which event the force of engagement will be increased in proportion to the resistance of the lock ring 77 to constriction. When the slips 16 are firmly set, the complemental wedging surfaces 75, 75a and 76, 76a, will flex the ring 77 and cause it to constrict about the mandrel section 3 so that the threads 79 of the lock ring 77 will be engaged with the thread 80 of the mandrel.

The upper extremity of the piston 71 is formed at 81 so as to closely fit within the lower extremity of the cone 15 so that the wedging section of the piston is firmly backed-up against deflection so as to assure positive locking engagement of the ring 77 with the mandrel.

For the purpose of description, the wickers 79 and 80 on the lock ring 77 and the mandrel section 3, respectively, have been referred to as having pitch angles of approximately 20°, while the cooperative wedge faces 75 and 75a have been referred to as being at an angle on the order of 30°, and the cooperative wedge faces 76 and 76a have been referred to as being at an angle on the order of 45°. These angles are referred to by way of illustration and not by way of limitation. However, it will be noted that as a result of the angles referred to, release of the lock ring 77 when pressure in the pressure chamber 70 is relieved will be assured upon upward movement of the mandrel 2 relative to the expander cone 15. Such release is assured by virtue of the fact that, as described, the 45° wedge surface 76 and the 20° pitch angle of the threads 79 and 80 provide a positive squeeze angle of 25°, tending to effect disengagement of the lock ring 77 from the mandrel.

However, since failure of the hold-down slips 16 to release from engagement with the casing 1, as a result of the lock ring 77 not freeing itself from the mandrel 2, when it is desired to retrieve the tool from a well, due to uncontrollable circumstances, would cause serious consequences, means are also provided for effecting a positive mechanical disengagement of the lock ring 77 from the mandrel 2. In this connection a pin or other projection carried by a non-rotatable part such as the expander cone 15 and, in the illustrative embodiment projecting from the wedging face 76, is disposed in the slot 78 of the lock ring 77 and the thread 80 is preferably of a left-hand lead. Accordingly, upon failure of the lock ring 77 to release, rotation of the mandrel 2 in a righthand direction will effect relative downward movement of the lock ring 77 by reason of the threaded engagement thereof with the lefthand threaded mandrel. Such movement of the lock ring 77 relative to the mandrel will force the piston 71 downwardly in the tubular housing 14 until an outstanding shoulder 83 on the piston engages an internal shoulder 84 on the tubular body 14. Following this, the complementary wedge faces 75, 75a and 76, 76a will be so spaced that the lock ring 77 is free of any wedging action and, accordingly, is free to assume a normal condition. In an aggravated case where the lock ring fails to disengage from the mandrel, the mandrel may be rotated to such an extent that the thread 80 thereon is completely removed from the lock ring 77, with the result that no further positive locking action will result.

In order to facilitate ease of operation of the hold-down slip mechanism, a seal 86 is provided between the inner surface of the expander cone 15 and the mandrel 2. A lip seal is herein illustrated, the purpose of which is to enable packing with a lubricant the space in which the lock ring 77 is disposed, so as to prevent the passage of well fluids into this space, and so as to maintain the parts freely movable.

Figures 3B, 6C:
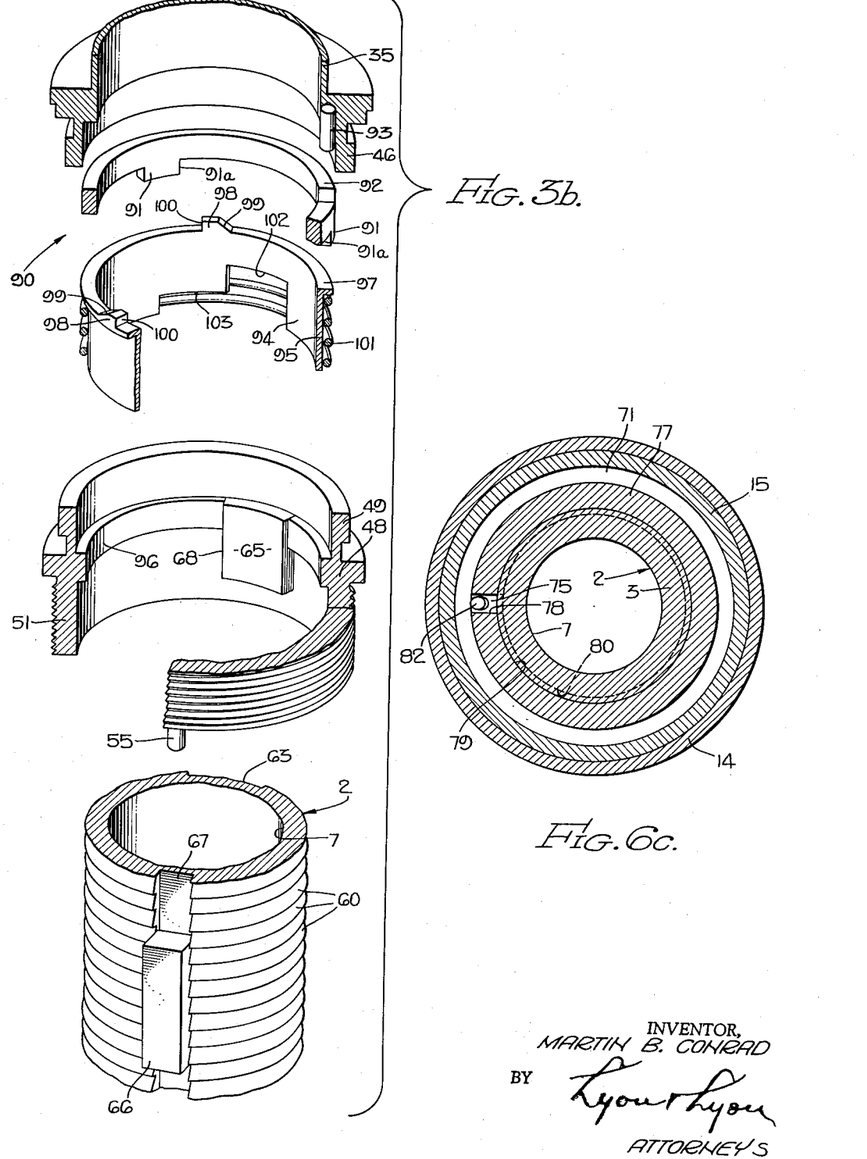

A novel mechanism is provided, as best seen in FIGS. 1b, 3a and 3b, whereby, if desired, in retrieving the subject tool from a well, the running-in string of pipe may be rotated by the rotary table at the surface, while a stand of pipe projecting into the derrick is held stationary so as to disconnect the joints making up the running-in string. In those instances where the tool is to be retrieved by rotating out of the hole—which is rotation in a righthand direction—then in order to effect disengagement of the releasable latch means, including the dog 58, the tool must be rotated to the left. Means are incorporated in the control mechanism 37 for accomplishing this result.

Such means preferably includes a one-way ratchet drive mechanism, generally designated 90. This one-way ratchet drive mechanism includes a suitable number of axially projecting lugs 91, which may be integrally formed on the end of drag block carrier 35, but which, in the illustrative embodiment, are shown as projecting from a ring 92 which is connected to the drag block carrier 35 by means of a dowel pin 93, so that the ring 92 remains stationary with drag block carrier 35 by reason of the frictional engagement of the drag blocks 41 with the wall of casing 1.

A ratchet sleeve 94 is disposed for cooperative engagement with the ring 92, the sleeve 94 having a skirt 95 reciprocally extending through an annular radially inwardly projecting flange 96 in the swivel adaptor 48. At one end, the skirt 95 is provided with a radial flange 97 having upstanding ratchet teeth 98 thereon, which are respectively provided with an inclined face 99 and an axially extended face 100. Interposed between the flange 97 of the sleeve 94 and the opposing flange 96 of swivel adaptor 48, is a suitable spring, such as a coiled compression spring 101, which provides means biasing the sleeve 94 towards the ring 92 into the position shown in FIG. 3a, for example. Thus it will be observed that the sleeve 94 may rotate in one direction and the inclined face 99 will cam the sleeve axially away from ring 92 as ratchet teeth 98 ride under the lugs 91 of ring 92. However, the sleeve 94 will not rotate in the opposite direction, inasmuch as axial face 100 of ratchet teeth 98 will engage axial face 91a of lugs 91 on ring 92 (see FIG. 3b).

In those instances where the swivel adaptor 48 is free to rotate; that is, when the key 50a of swivel ring 47, previously described, is omitted therefrom, positive connection of the swivel adaptor 48 to the tubular means 8 is through the intermediary of ring 92 and sleeve 94. It should be understood that this ring 92 and this sleeve 94 may remain in the control mechanism 37 at all times, but will be rendered inoperative if the tool is assembled with a swivel ring 47 provided with a key 50a, since in the latter case, as has been previously described, positive connection of the tubular means 8 and the swivel adaptor 48 is effected through key 50a and lugs 46a and 49a on drag block carrier 35 and swivel adaptor 48, respectively.

The skirt 95 of sleeve 94 is provided with an axially extended slot 102 which is so formed as to receive stop block 65 on swivel adaptor 48, so that the sleeve 94 is free for axial movement on the block 65 but is keyed by the latter to the swivel adaptor 48 for rotation therewith. The lower extremity of the skirt 95 of sleeve 94, throughout most of its circumferential extent, will normally ride upon the upper extremity of key 66 on the mandrel 2 so that reciprocation of the sleeve 94 is precluded. As long as the skirt 95 is engaged with the upper end of the key 66, no full swivelling action can occur, since the sleeve 94 cannot be cammed axially by the ratchet teeth 98. However, adjacent the slot 102 of the skirt 95, the skirt is circumferentially relieved, as at 103, so that upon rotation of the mandrel 2 to a position where the key 66 (as shown in broken lines in FIG. 3a) engages the face 68 of stop block 65, the sleeve 94 will be free for axial movement to the extent necessary to permit ratching of the mechanism 90; that is, to the extent shown in broken lines in FIG. 3a, whereupon the control mechanism is free to swivel in one direction relative to the drag block carrier 35.

No positive connection between the drag block carrier 135 and the control mechanism 37 exists during righthand rotation of the mandrel, but upon lefthand rotation of the latter the control mechanism will be operated to selectively effect disengagement of the dog 58 from the mandrel wickers 60, by reason of the dog 58 being disposed in the longitudinal clearance 63 provided in these wickers, or to effect engagement of the dog 58 with the wickers 60 as may be desired for setting or retrieving the tools, respectively.

As has been pointed out previously, the tool may be operated with the ratchet mechanism 90 installed, but rendered inoperative by the inclusion of a key 50a in swivel ring 47; and as will be pointed out hereinafter, the tool may be selectively dressed to enable it to be set up on righthand rotation or lefthand rotation as may be desired. When righthand rotation is employed to set the tool, the key 66 will abut face 68 of stop block 65 during packer setting manipulation of the tool; but when the tool is dressed for lefthand packer setting rotation of the mandrel, the key 66 will engage face 68 of stop block 65 when the tool is released from engagement with the casing and is being rotated out of the hole.

Figure 7A:
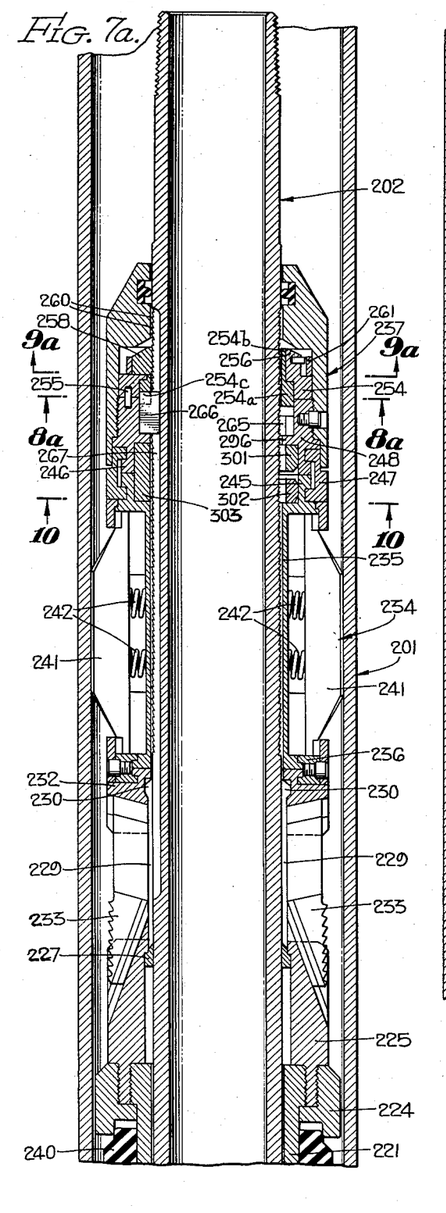
FIGS. 7a and 7b show a modified well tool or packer adapted to be set responsive to tensioning or elevating the running-in string, and incorporating a modified control mechanism made in accordance with the invention, the packer being shown in a condition for running into a well or retrieval therefrom.
Figure 7B:
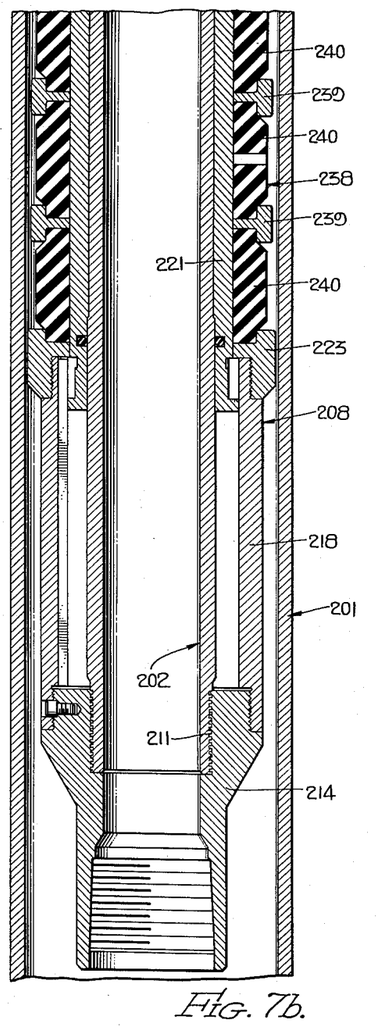

Referring particularly to FIGS. 7a and 7b, the control mechanism 237 is shown as embodied in a modified type of tool which is characterized in the field as a "downsqueeze" tool, but which may be characterized for the purpose of this description as a tool which is adapted to be set by tensioning of the running-in string of pipe so as to cause movement of the mandrel 202 upwardly with respect to the tubular means 208.

It should be noted that, generally speaking, the assembly of FIGS. 7a and 7b is substantially the same as that described in the foregoing, except with respect to the control mechanism which is of a modified construction. In addition, only anchor slips 233 are shown in FIGS. 7a and 7b since in tension-operated tools, holddown slips are not necessary and are not usually employed.

As shown in FIG. 7b, the connector sub 218 is connected to a coupling 214 to which the lower extremity of the mandrel 202 is secured, as by a threaded coupling 211, whereby elevation of the mandrel 202 will effect corresponding elevation of the connector sub 218 in FIG. 7b, thus setting the anchor slips 233 and the packer rubbers 240 as a result of the casing engaging friction means 234 resisting elevation of the anchor slips and the packer element 238, as will be understood by those skilled in the art.

Connector sub 218 is telescopically engaged about the packing element supporting sleeve 221 and is provided with an abutment member 223 engaging the lowermost packer rubbers 240, so as to press the packer rubbers and gauge rings 239 therebetween towards the flange 224 at the upper end of packing element supporting sleeve 221.

Expander cone 225 tapers axially in the direction of the casing engaging friction means 234 for expanding the slips 233 as a function of upward movement of the mandrel 202, while tie member 227 has circumferentially spaced tie fingers 229 and protuberances 230 interlocked with the cone 225 and the anchor slip ring 232, respectively, so as to tie the tubular means 208 to the control mechanism 237 while the tool is being run into a well or retrieved. The casing engaging friction means 234 is swivelly connected to the slip ring 232, as by swivel ring 236, and includes drag blocks 241 urged into engagement with the casing 201, as by means of springs 242.

Control mechanism 237 includes a swivel adaptor 248 connected to the drag block carrier 235 by a swivel ring 247, the swivel ring 247 being retained in place by control mechanism housing 252. Connected to the swivel adaptor 248 by dowel 255, is a dog carrier 254 having laterally shiftably carried thereby, a dog 258. An annular spring 261 is disposed about the axial extension 256 of the dog carrier, so as to normally bias the dog 258 into engagement with wickers 260 on the mandrel 202. The pin 262 maintains the spring 261 in eccentric relation to the dog carrier extension 256 so as to resiliently hold the dog 258 in engagement with the mandrel 202.

It will be noted that the elements thus far described in connection with the construction of FIGS. 7a and 7b generally correspond to the construction shown in FIGS. 1a and 1b, but with the assembly inverted.

In this modified construction, the wickers 260 on the mandrel 202 are continuous except for the key slot 267. Accordingly, in order to release the mandrel 202 for axial movement within the tubular assembly 208, it is necessary to shift the dog 258 laterally out of engagement with the mandrel. Means are provided for this purpose, including a dog shifter sleeve 254a, which encircles the mandrel within the dog carrier 254.

Projecting axially from the sleeve 254a is an arcuate prong 254b which overlies the wickers 260 on the mandrel and which, upon rotation, is adapted to ride under the dog 258 and cam the latter laterally out of engagement with the mandrel. In order to effect rotation of the dog shifter sleeve 254a, it is provided with a slot 254c into which the key 266 extends, so that the sleeve 254a will rotate upon rotation of the mandrel. Preferably slot 254c is wider than the key 266, as is best seen in FIGS. 8a and 8b, so as to provide a limited free rotation of the mandrel.

Upon rotation of the mandrel 202, the key 266 will drive the dog shifter sleeve 254a until the key comes into abutting engagement with the stop 265 in swivel adaptor 248. In one direction of rotation the key 266 will abut one side of the stop 265, while in the other direction of rotation the key will abut the other side of stop 265, and dog shifter prong 254b will be in a position as shown in FIG. 9a on the one hand, or as shown in FIG. 9b on the other hand, with the dog 258 disengaged from the mandrel or engaged therewith, as the case may be, depending upon the assembled relationship of dog carrier 254 and swivel adaptor 248.

This relationship is determined by dowel 255, which may be disposed in an opening 255a, or in an opening 255b, selectively, as the tool is being dressed or assembled for use. In this connection it will be recognized that the extent of angular movement of the mandrel 202 and the dog shifter sleeve 254a is determined by the stop projection 265 in the swivel adapter 248; further, since the dog carrier ring 254 is pinned to the swivel adapter 248 by the dowel 255 and since the dog 258 is carried by the dog carrier ring, the angular relation of the dog 258 to the stop projection 265 will be determined by the location of the dowel 255 in the recess 255a on the one hand or in the recess 255b on the other hand, in the swivel adapter 248, as best seen in FIGS. 8a and 8b. In the construction shown, therefore, with the dowel 255 disposed in the recess 255a rotation of the mandrel 202 in a clockwise direction as viewed in FIG. 8a will be limited by engagement of key 266 with the stop projection 265 (see FIG. 7a) so that the dog shifter prong 245b will be arrested prior to reaching the position lying between the dog 258 and the mandrel 202; whereas rotation of the mandrel 202 (to the left) in a counter-clockwise direction as seen in FIG. 8a through substantially ¾ of a revolution will be permitted before the key 266 comes into contact with the stop projection 265, and under these conditions the dog shifter prong 254b will assume the position shown in FIG. 9b in which the dog 258 is disengaged from the mandrel 202. Upon reversal of the relationship of the dowel 255 and the cooperative recesses 255a and 255b in the swivel adapter 248, that is when the dowel 255 is inserted in the opening 255b, then the angular relation of the dog 258 to the stop projection 265 will be such that rotation of the mandrel 202 in a counter-clockwise direction will be limited by engagement of key 266 with stop projection 265 so that the dog shifter prong 254b cannot move the dog from engagement with the mandrel; while rotation of the mandrel 202 in a clockwise direction will effect disengagement of the dog from the mandrel. In the illustrative embodiment, the openings 255a and 255b are shown as being formed in the dog carrier 254, while the pin or dowel 255 is carried by the swivel adaptor 248. It will be understood, however, that the result of this construction is to provide means for selectively fixing the relative angular relationship of dog shifter prong 254 to dog 258 when the tool is made up, and other selectively interengageable instrumentalities may be availed of.

Figures 8A, 8B, 9A, 9B:
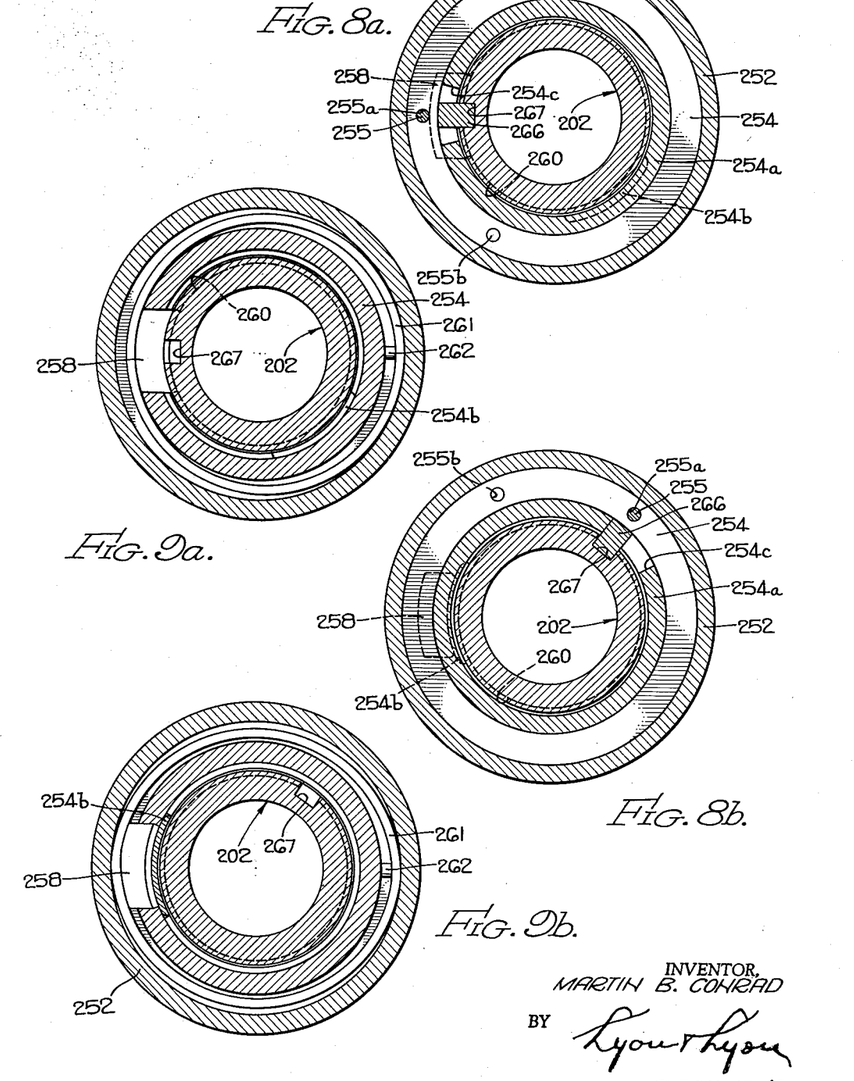

When the dowel 255 is disposed in opening 255a, as shown in FIGS. 8a and 8b, rotation of the mandrel 202 in a counter-clockwise direction as shown; that is, in a righthand direction as related to operation of the packer from the rig at the surface, through substantially ¾ revolution will be required to shift dog lifter prong 254b relative to the dog 258, so that the lifter prong 254b will ride beneath the dog 258, camming the latter radially outwardly as shown in FIG. 9b particularly. When the dog lifter prong 254b is engaged beneath dog 258, the key 266 will be in engagement with one side wall of the stop block 265 in swivel adaptor 248. However, rotation of the mandrel 202 in a clockwise direction, as viewed in FIG. 8a, will be limited by engagement of key 266 with the opposite side face of stop block 265 interiorly of the swivel adaptor 248 as previously described.

If it should be desired to dress the packer of FIGS. 7a and 7b for lefthand rotation of the running-in string in order to effect release of the dog 258 from the mandrel 202, thus to enable setting of the packer, then in assembling the dog carrier 254 in the control mechanism 237, the dog carrier 254 will be rotatively displaced from the position shown in FIG. 8a, so that the aperture 255b will receive the dowel 255. Under these circumstances the running-in string may be rotated to the left, thus effecting clockwise rotation of the mandrel 202 as viewed in FIG. 8a, with the result that the dog shifter prong 254b will ride beneath the dog upon rotation of the running-in string as aforesaid. However, upon rotation of the running-in string to the right, with consequent counter-clockwise rotation of the mandrel 202 as viewed in FIG. 8a, the key 266 will abut with the stop block 265 in swivel adaptor 248 to preclude disengagement of the dog 258 from the mandrel 202 by the shifter prong 254b.

As has previously been described, one of the features of the tool of the present invention is the provision of means whereby the running-in string joints may be broken out and unthreaded by gripping the running-in string in a rotary table, and rotating the entire running-in string as the casing engaging friction means remains non-rotatable within the well bore defined within the casing. During such a "rotating out of the hole" operation, the control mechanism 237 will be dressed for lefthand packer setting rotation and, accordingly, the dowel 255 will be disposed in the aperture 255b.

In the embodiment of FIGS. 1 through 6, a one-way positive drive ratchet mechanism 90 is disclosed, so that the casing engaging friction means 34 of that embodiment may remain nonrotatively engaged with the well casing while the running-in string and mandrel 2 are rotated in a righthand direction.

In the upstrain or tension-operated embodiment of FIGS. 7a and 7b, a modified swivel mechanism is disclosed in the form of friction clutch means operatively interposed between the casing engaging friction means 234 and the control mechanism 237 for transmitting sufficient torque between the control mechanism and the casing engaging friction means to enable operation of the control mechanism. However, the torque transmitting capacity of the clutch means is insufficient to cause rotation of the casing engaging friction means 234 along with the mandrel 202 during the above-referred-to "rotating out of the hole" operation.

As an illustrative example, this friction clutch means includes a partly circular friction shoe 301 pressed into the swivel adaptor 248 at one side of the internal flange 296; a second partly circular friction shoe 302 is pressed into the cylindrical extension 245 of drag block carrier 235. As is best seen in FIG. 10, the friction shoe 302, as does the friction shoe 301 therebelow as viewed in FIG. 10, has disposed between its opposed ends a drive block 303, whereby a friction connection is established between swivel adaptor 248 and drag block carrier 235, through friction shoe 301 to drive block 303, and thence from drive block 303 to friction shoe 302. Of course, when the friction means just described is being employed in the packer device to enable rotating out of the hole, then the means more particularly shown in FIGS. 5a, 5b and 5c for selectively adjusting the tool for rotation to a selected extent, will not be employed, since the latter means will prevent a free swivel of the control mechanism. However, if the full swivel connection is not desired in the packer tool of FIGS. 7a and 7b, then the selective mechanisms of FIGS. 5a, 5b and 5c may also be employed in this embodiment of the invention.

In the use of the upstrain or tension-operated tool of FIGS. 7a and 7b, the packer will be run into a well to the elevation at which it is desired to set the same, with the parts in the condition as shown in FIGS. 7a and 7b. Rotation of the running-in string to the right or to the left, depending upon the setting of dowel 255 in the selective apertures 255a and 255b, will effect rotation of the mandrel 202 correspondingly until the key 266 abuts with stop block 265 in swivel adaptor 248, at which time the dog shifter prong 254b will have shifted to a position intermediate the mandrel 202 and the dog 258, as shown in FIG. 9b, so that the mandrel is free for axial movement within the control mechanism 237.

Rotation of the dog carrier 254 along with the mandrel upon engagement of the shifter prong 254b with the dog 258, is precluded by reason of the dowel connection 255 and the friction connection effected through friction shoes 301 and 302 and friction drive block 303, between the swivel adaptor 248 and the drag block carrier 235.

When the mandrel has thus been freed for axial movement, the running-in string will be elevated, thus elevating coupling 214 at the lower extremity of the mandrel 202 and shifting the coupling 214 upwardly relative to the casing engaging friction means 234 which remains fixed. Consequently, packer elements 240 will be compressed axially and expanded radially into engagement with the casing as abutment 223 moves upward towards flange 224 and as the slips 233 are expanded radially into engagement with the casing. Engagement of the casing by the slips 233 will securely retain the packer against upward movement in the casing, so that fluid may be injected downwardly through the running-in string and through the mandrel, and pressure in the well beneath the packer assembly will not cause the packer to shift in the casing.

Retrieval of the packer of FIGS. 7a and 7b following the completion of fluid injection or fluid placement operations in the well may be effected by lowering the running-in string so as to relieve the upstrain or tension on the packer mandrel, and compression on the packer elements 240 will accordingly be relieved and the slips 233 will be disengaged from the casing as expander 255 moves axially downwardly with respect to the slips.

Figure 6B:
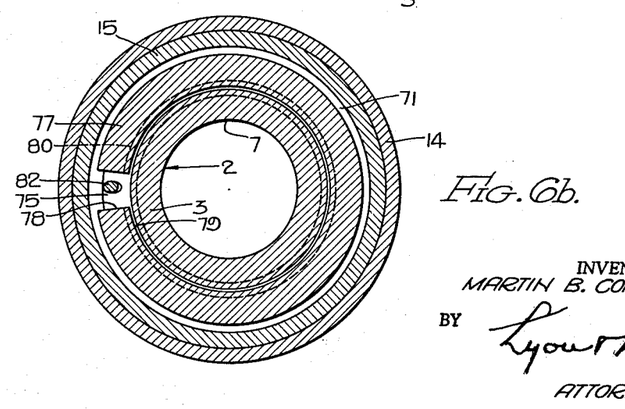
Figures 11A, 11B, 12:
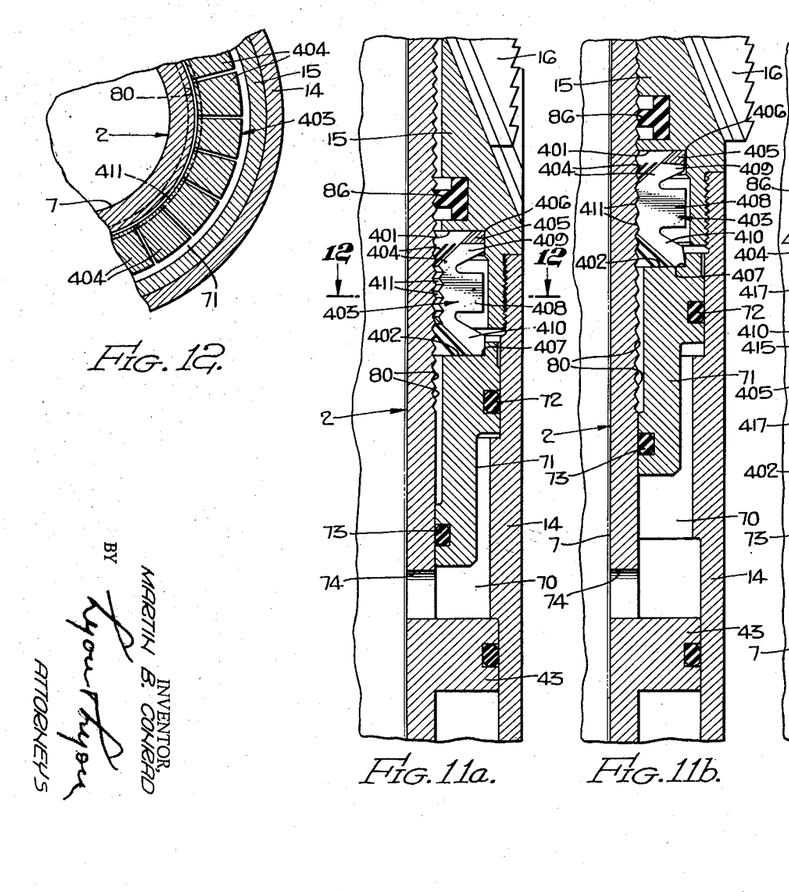

Referring now to FIGS. 11a, 11b and 12, a modified hold-down slip operating and lock mechanism is shown, for use in lieu of the mechanism previously described and more particularly shown in FIGS. 6a and 6b. In FIGS. 11a, 11b and 12, as in the construction previously described, the mandrel is shown at 2, about which is disposed the tubular housing 14, having threadedly connected at its upper extremity an expander cone 15 for expanding slips 16 into engagement with the well bore defined by the casing. The mandrel 2 is provided with external wickers or threads, as at 80, and between the tubular housing 14 and the mandrel 2 there is a pressure chamber 70 communicating through port 74 with the opening through the mandrel and containing a piston 71. Projecting radially from the mandrel 2 is the flange 43 which is sealingly engaged with the inner periphery of the tubular housing 14.

In this modified construction the expander 15 has an internal radial shoulder 401, opposed by an end face 402 of the piston 71. Between the elements providing shoulder 401 and face 402 there is disposed a flexible locking member 403 comprising an annularly arranged series of flexible fingers 404 interconnected by a ring 405. The ring 405 seats in a corner 406 formed at the outer periphery of the radial shoulder 401, and the fingers 404 are engaged at their free extremities in a corner 407 formed at the outer periphery of end face 402 of piston 71. It will be noted that the fingers 404 each comprise a massive central body 408, a portion 409 extending at an angle from the body towards the ring 405, and a portion 410 extending at an angle from the body into the corner 407 referred to above. As a result of this construction, axial loading of the fingers 404 will create a bending at the juncture of the portions 409 and 410 with the body 408, so that the central body 408 will shift radially inwardly into engagement with the mandrel 2 as a function of the resultant vector movement and force created upon such axial loading. Accordingly, the fingers 404 are each, in this embodiment, provided with wickers 411, complemental to the wickers 80 on the mandrel, for engagement therewith; whereby, as shown in FIG. 11b, when fluid under pressure enters the chamber 70, the piston 71 will be shifted upwardly within tubular housing 14, and when the expander 15 has shifted the slips 16 into firm engagement with the casing, further upward movement of the tubular housing 14 will be prevented, and fluid pressure acting on the piston 71 will effect locking engagement of the fingers 404 with the mandrel 2, thus the hold-down slips 16 will be expanded and locked in engagement with the casing.

Figure 13:
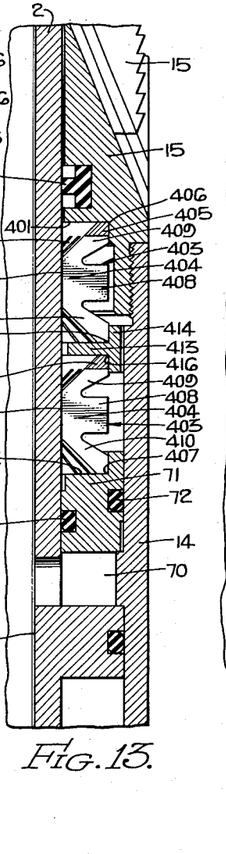
FIG. 13 is a fragmentary view in longitudinal section through a further modification of the hold-down slip locking means, wherein a frictional lock is provided.

Referring to FIG. 13, a further modification is shown, wherein the general construction is similar to that previously described, but wherein the piston 71 is foreshortened, so that between the end face 402 thereof and the shoulder 401 on expander 15, a pair of locking devices is accommodated. In order to provide an abutment surface for the fingers 404 of the compound locking devices of FIG. 13, an intermediate ring 413 having an axially extended outer peripheral flange 414 is interposed between the locking devices and provides a corner 415 and a corner 416, in which seat the the flexible portion 410 of the upper locking device and the ring 405 of the lower locking device respectively.

In lieu of wickers on the locking fingers 404 in this modification, the mandrel 2 provides a smooth cylindrical surface, against which the central sections of the locking fingers 404 are frictionally engageable, and the locking fingers in lieu of wickers are also respectively provided with a smooth mandrel-engaging face 417.

In the use of the locking means shown in FIGS. 11a, 11b and 12, should piston 71 fail to release the locking fingers 404 from engagement with the mandrel due to the piston becoming sanded up in the piston chamber, rotation of the mandrel will effect disengagement of the locking fingers by reason of the helical disposition of wickers 80. In the modification of FIG. 13, however, rotation of the mandrel would not be required, since the mandrel may be forcibly shifted relative to the locking fingers 404 in this embodiment, by the imposition on the tubing string of a force greater than the frictional holding efforts of these locking fingers.

Figure 14:
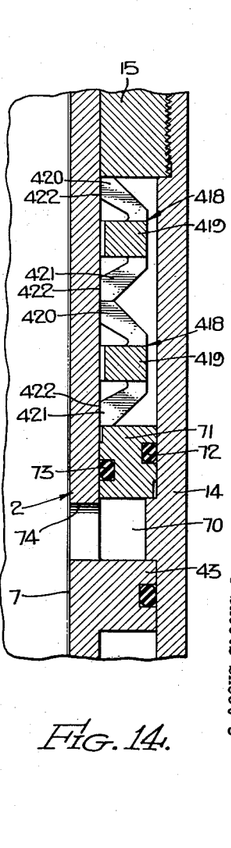
FIG. 14 is a fragmentary view in longitudinal section of still another modification of the hold-down slip lock mechanism.

A further friction means for locking the hold-down slips in engagement with the casing is illustrated in FIG. 14, wherein friction elements are generally designated at 418 and include an annular rigid body 419, respectively having flexible fingers 420 and 421 diverging from the outer periphery of the rings 419 towards the mandrel 2. In this embodiment, the inner extremities of the fingers 420 and 421 of the respective friction devices 418 are provided with friction surfaces 422 engageable with the smooth outer surface of the mandrel 2. The rigid bodies or rings 419 will resist circumferential expansion when the fingers 420 and 421 are loaded axially, and as a consequence, axial loading of these fingers will result in the application of a vector movement and holding force on the mandrel 2, whereby the expander 15 will be securely held in position as a result of fluid pressure in the chamber 70.

In view of the foregoing, it will now be recognized that the present invention provides an extremely versatile packer or other tool for use in wells wherein it is desired to control the setting of slip packer or other expansible mechanism in engagement with the well casing through manipulation of the running-in string of tubing, and that the objects and advantages stated at the commencement hereof have been fully accomplished.

While the specific details of several modifications of the invention have been herein shown and described, changes and alterations may be resorted to without departing from the spirit thereof as defined in the appended claims.

I claim:

1. In a well tool adapted to be run into a well bore on a running-in string, and comprising: a mandrel connectible to the running-in string, friction means engageable with the well bore wall and shiftably mounted on said mandrel, means for releasably latching said friction means to said mandrel, and expansible means operatively connected to said friction means and actuatable into engagement with the well bore wall upon relative longitudinal movement between said mandrel and said friction means, control means operatively connected with said friction means and said latching means for releasing said latching means upon rotation of said mandrel relative to said friction means, said latching means including a segmental dog engageable with said mandrel, said mandrel and said dog having coengageable elements for preventing longitudinal movement of said mandrel relative to said friction means when said elements are engaged, said mandrel having means for effecting disengagement of said mandrel and dog elements upon rotation of said mandrel relative to said dog, said control means having means for holding said dog against movement with said mandrel upon rotation of said mandrel, including a member swivelly connected to said friction means, and means for effecting a drive connection between said friction means and said dog holding means.

2. A well tool as defined in claim 1, wherein the means for effecting disengagement of said mandrel and dog elements upon rotation of said mandrel comprises a longitudinally extended smooth surface on said mandrel interrupting said dog engaging elements on the mandrel.

3. A well tool as defined in claim 1, wherein said coengageable elements on said mandrel and on said dog comprise circumferentially extended wickers, and the means for effecting disengagement of said mandrel and dog elements comprises a longitudinal slot extending through the wickers on said mandrel.

4. A well tool as defined in claim 1, wherein the means for effecting disengagement of said mandrel and dog elements comprises a member rotatable with said mandrel and having means engageable with said dog to shift the dog laterally from engagement with said mandrel.

5. A well tool as defined in claim 1, wherein the means for effecting disengagement of said mandrel and dog elements comprises a dog shifter ring disposed about said mandrel, said ring having means engageable with said dog to shift the dog laterally from engagement with said mandrel, a key connecting said ring to said mandrel for rotation therewith, stop means disposed in the path of said key for limiting rotation of said mandrel in opposite directions, and means for adjusting the angular setting of said dog relative to said stop.

6. A well tool as defined in claim 1, wherein the means for effecting a drive connection between said friction means and said dog holding means includes a pin carried by one of said latter means, the other of said latter means having a pair of angularly displaced sockets for receiving said pin to adjust the angular position of said dog holding means, and means for limiting rotation of said mandrel relative to said dog holding means.

7. A well tool as defined in claim 1, wherein the means for effecting a drive connection between said friction means and said dog holding means includes friction clutch means.

8. A well tool as defined in claim 1, wherein the means for effecting a drive connetion between said friction means and said dog holding means includes one way ratchet clutch means.

9. A well tool as defined in claim 1, wherein the means for effecting a drive connection between said friction means and said dog holding means includes a swivel ring connecting said friction means to said member, said friction means, said member and said swivel ring having projections engageable with one another upon predetermined swivelling of said friction means and said member.

10. In a well tool adapted to be run into a well bore on a running-in string, and comprising: a mandrel connectible to the running-in string, friction means engageable with the well bore wall and shiftably mounted on said mandrel, means for releasably latching said friction means to said mandrel, expansible means operatively connected to said friction means and actuatable by said mandrel into engagement with the well bore wall upon relative longitudinal movement of said mandrel relative to said friction means, the improvement comprising control means operatively connected with said friction means and said latching means for releasing said latching means upon rotation of said mandrel relative to said friction means in either direction, said control means including selectively positionable parts and means selectively interengageable with said parts for preventing release of said latching means upon rotation of said mandrel in one direction and permitting release of said latching means upon rotation of said mandrel in the other direction.

11. In a well tool adapted to be run into a well bore on a running-in string, and comprising: a mandrel connectible to the running-in string, friction means engageable with the well bore wall and shiftably mounted on said mandrel, means for releasably latching said friction means to said mandrel, and expansible means operatively connected to friction means and actuatable into engagement with the well bore wall upon relative longitudinal movement of said mandrel and said friction means, the improvement comprising control means operatively connected with said friction means and said latching means for releasing said latching means upon rotation of said mandrel relative to said friction means, said control means including a stop, a member on said mandrel engageable with said stop upon rotation of said mandrel in either direction, and means for selectively operatively connecting said latching means to said control means in selective positions relative to said stop whereby said latching means will be released from said mandrel upon rotation of the mandrel in a selected direction of rotation.

12. In a well tool adapted to be run into a well bore on a running-in string, and comprising: a mandrel connectible to the running-in string, friction means engageable with the well bore wall and shiftably mounted on said mandrel, means for releasably latching said friction means to said mandrel, and expansible means operatively connected to said friction means and actuatable into engagement with the well bore wall upon relative longitudinal movement of said mandrel and said friction means, the improvement comprising control means operatively connected with said friction means and said latching means for releasing said latching means either upon rotation of said mandrel in a righthand or lefthand direction selectively relative to said friction means and for preventing release of said latching means upon rotation of said mandrel in the other direction, said latching means including a latch element engageable with said mandrel, and said control means including a carrier for said latch element, and means for selectively positioning said carrier relative to said mandrel.

13. In a well tool adapted to be run into a well bore on a running-in string, and comprising: a mandrel connectible to the running-in string, friction means engageable with the well bore wall and shiftably mounted on said mandrel, means for releasably latching said friction means to said mandrel, and expansible means operatively connected to said friction means and actuatable into engagement with the well bore wall upon relative longitudinal movement of said mandrel and said friction means, the improvement comprising control means operatively connected with said friction means and said latching means for releasing said latching means either upon rotation of said mandrel in a righthand or lefthand direction selectively relative to said friction means and for preventing release of said latching means upon rotation of said mandrel in the other direction, said latching means including an arcuate latch element engageable circumferentially of said mandrel, said control means including a carrier for said latch element, and said carrier having circumferentially spaced means selectively engageable with said control means for adjusting the angular position of said latch element relative to said mandrel.

14. In a well tool adapted to be run into a well bore on a running-in string, and comprising: a mandrel connectible to the running-in string, friction means engageable with the well bore wall and shiftably mounted on said mandrel, means for releasably latching said friction means to said mandrel, and expansible means operatively connected to said friction means and actuatable into engagement with the well bore wall upon relative longitudinal movement of said mandrel and said friction means, control mechanism operatively connected with said friction means and said latching means for releasing said latching means upon rotation of said mandrel relative to said friction means, and means in said control mechanism for selectively adjusting the extent of rotation of said mandrel required to release said latching means.

15. In a well tool adapted to be run into a well bore on a running-in string, and comprising: a mandrel connectible to the running-in string, friction means egageable with the well bore wall and shiftably mounted on said mandrel, means for releasably latching said friction means to said mandrel, and expansible means operatively connected to said friction means and actuatable into engagement with the well bore wall upon relative longitudinal movement of said mandrel and said friction means, control mechanism operatively connected with said friction means and said latching means for releasing said latching means upon rotation of said mandrel relative to said friction means, said control mechanism including a pair of members disposed about said mandrel, means rotatably connecting said members together, and said connecting means and said members having means for selectively adjusting the extent of rotation of said mandrel required to release said latching means.

16. A well tool as defined in claim 15 wherein said adjusting means includes a projection on said connecting means and a pair of projections on each of said members, said projections being selectively engageable for limiting rotation of said members relative to one another.

17. A well tool as defined in claim 15 wherein said members each include a cylindrical section, said connecting means including a swivel ring disposed about said cylindrical sections, said cylindrical sections and said swivel ring having coengaged portions retaining said cylindrical sections in assembly, and said adjusting means including coengageable projections on said cylindrical sections and said swivel ring.

18. A well tool as defined in claim 15 wherein said members each include a cylindrical section, said connecting means including a swivel ring disposed about said cylindrical sections, said cylindrical sections and said swivel ring having coengaged portions retaining said cylindrical sections in assembly, and said adjusting means including a key on said swivel ring, and a pair of circumferentially spaced ears on each of said members selectively engageable with said key.

19. In a well tool adapted to be run into a well bore on a running-in string, and comprising: a mandrel connectible to the running-in string, friction means engageable with the well bore wall and shiftably mounted on said mandrel, means for releasably latching said friction means to said mandrel, and expansible means operatively connected to said friction means and actuatable into engagement with the well bore wall upon relative longitudinal movement of said mandrel and said friction means, control means operatively connected with said friction means and said latching means for operating said latch means responsive to rotation of said mandrel relative to said friction means, said friction means and said control means including cylindrical sections engaged with one another, means for retaining said cylindrical sections together and for permitting relative rotation of said sections including a split ring composed of semi-cylindrical halves, and means for releasably securing said halves about said cylindrical sections.

20. In a well tool adapted to be run into a well bore on a running-in string, and comprising: a mandrel connectible to the running-in string, friction means engageable with the well bore wall and shiftably mounted on said mandrel, means for releasably latching said friction means to said mandrel, and expansible means operatively connected to said friction means and actuatable into engagement with the well bore wall upon relative longitudinal movement of said mandrel and said friction means, control means operatively connected with said friction means and said latching means for operating said latch means responsive to rotation of said mandrel relative to said friction means, said friction means and said control means including cylindrical sections engaged with one another, means for retaining said sections together, including a swivel ring engaged with said sections and comprising semi-circular half-sections, said control means also including a housing, said housing having an annular skirt disposed about said swivel ring for retaining said half sections assembled about said cylindrical sections.

21. In a well tool adapted to be run into a well bore on a running-in string, and comprising a mandrel connectible to the running-in string, friction meas engageable with the well bore wall and shiftably mounted on said mandrel, means for releasably latching said friction means to the mandrel, and expansible means operatively connected to said friction means and actuatable into engagement with the well bore wall upon relative longitudinal movement of said mandrel and said friction means, control means operatively connected with said friction means and said latching means for operating said latch means responsive to rotation of said mandrel relative to said friction means, said friction means and said control means including cylindrical sections engaged with one another, means for retaining said sections together including a swivel ring engaged with said sections and comprising semi-circular half-sections, and a member having a skirt threadedly connected to one of said sections with said skirt projecting into surrounding engagement with said swivel ring half sections for retaining said half sections about said cylindrical sections.

22. In a well tool adapted to be run into a well bore on a running-in string, and comprising: a mandrel connectible to the running-in string, friction means engageable with the well bore wall and shiftably mounted on said mandrel, means for releasably latching said friction means to said mandrel, and expansible means operatively connected to said friction means and actuatable into engagement with the well bore wall upon relative longitudinal movement of said mandrel and said friction means, control means operatively connected with said friction means and said latching means for releasing said latching means upon rotation of said mandrel in one direction relative to said friction means, said control means including a pair of members disposed about said mandrel, swivel means rotatably connecting said pair of members, operating means for releasing said latching means carried by one of said members, and torque transmitting means engaged with said members for connecting said operating means to said friction means for releasing said latching means upon rotation of the mandrel in said one direction and for permitting swivelling of said control means relative to said friction means upon rotation of said mandrel in the other direction.

23. A well tool as defined in claim 22 wherein said torque transmitting means comprises a one way clutch mechanism.

24. A well tool as defined in claim 22 wherein said torque transmitting means comprises a ratchet element carried by one of said members, a complemental ratchet element carried by the other of said members, and means normally maintaining engagement of said ratchet elements.

25. A well tool as defined in claim 22 wherein said torque transmitting means comprises a ratchet element carried by one of said members, a complemental ratchet element carried by the other of said members, means normally maintaining engagement of said ratchet elements, and said mandrel and one of said ratchet elements having means for permitting ratchetting of said ratchet elements upon rotation of said mandrel in said other direction.

26. A well tool as defined in claim 22 wherein said torque transmitting means comprises a ratchet element carried by one of said members, a complemental ratchet element carried by the other of said members, means biasing said ratchet elements into engagement, and means on said mandrel and one of said ratchet elements for retaining said ratchet elements in engagement during rotation of said mandrel in said one direction.

27. A well tool as defined in claim 22 wherein said torque transmitting means comprises a friction clutch mechanism.

28. A well tool as defined in claim 22 wherein said torque transmitting means comprises friction clutch elements engaged with the respective members and means interconnecting said clutch elements.

29. A well tool as defined in claim 22 wherein said members respectively include a portion having a cylindrical surface, and said torque transmitting means including a clutch ring engaged with the respective cylindrical surfaces.

30. A well tool as defined in claim 22 wherein said members respectively include a portion having a cylindrical surface, and said torque transmitting means including a pair of clutch rings engaged with the respective cylindrical surfaces and means interconnecting said clutch rings.

31. A well tool as defined in claim 22 wherein said members respectively include a portion having a cylindrical surface, and said torque transmitting means including a pair of clutch rings engaged with the respective cylindrical surfaces, said clutch rings being split and having circumferentially opposed ends, and a rigid member interposed between said clutch rings and engaged with the opposed ends thereof.

References Cited in the file of this patent

UNITED STATES PATENTS

| | | |
|---|---|---|
| 2,368,401 | Baker | Jan. 30, 1945 |
| 2,753,943 | Morgan | July 10, 1956 |
| 2,778,430 | Baker | Jan. 22, 1957 |
| 2,802,534 | Conrad | Aug. 13, 1957 |
| 2,815,080 | Long | Dec. 3, 1957 |
| 2,836,250 | Brown | May 27, 1958 |
| 2,871,949 | Baker | Feb. 3, 1959 |
| 2,874,784 | Baker et al. | Feb. 24, 1959 |